United States Patent
Wei et al.

(10) Patent No.: US 11,611,378 B2
(45) Date of Patent: *Mar. 21, 2023

(54) ENHANCED CSI FEEDBACK FOR FD-MIMO

(71) Applicant: QUALCOMM Incorporated, San Diego, CA (US)

(72) Inventors: Chao Wei, Beijing (CN); Wanshi Chen, San Diego, CA (US); Peter Gaal, San Diego, CA (US); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/028,974

(22) Filed: Sep. 22, 2020

(65) Prior Publication Data

US 2021/0006310 A1    Jan. 7, 2021

Related U.S. Application Data

(62) Division of application No. 15/531,131, filed as application No. PCT/CN2015/070988 on Jan. 19, 2015, now Pat. No. 10,826,577.

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0469* (2013.01); *H04B 7/0478* (2013.01);
(Continued)

(58) Field of Classification Search
CPC .. H04B 7/0456; H04B 7/0469; H04B 7/0478; H04B 7/0486; H04B 7/0626;
(Continued)

(56) References Cited

U.S. PATENT DOCUMENTS 9,673,945 B2   6/2017   Geirhofer et al.
11,121,752 B2 *   9/2021   Wei ................... H04B 7/0478
(Continued)

FOREIGN PATENT DOCUMENTS

CN   102045762 A   5/2011
CN   102255689 A   11/2011
(Continued)

OTHER PUBLICATIONS

China Telecom: "CSI-RS Design and CSI Reporting for EB/FD-MIMO", 3GPP TSG RAN WG1 Meeting #79, R1-144954, San Francisco, USA, Nov. 17-21, 2014, pp. 1-3.
(Continued)

*Primary Examiner* — Michael J Moore, Jr.
(74) *Attorney, Agent, or Firm* — Norton Rose Fulbright LLP

(57) ABSTRACT

Enhanced channel state information (CSI) feedback is disclosed for full dimensional multiple input, multiple output (FD-MIMO) operations. In one aspect, a single CSI process is defined that is configured with an azimuth and elevation CSI-reference signal (RS) ports. A user equipment (UE) will send a precoding matrix indictor (PMI) report including a precoding matrix indicator (PMI) for the azimuth ports and a PMI for the elevation ports. One of the PMIs is assigned a low rank. The base station will use the two PMIs to create a whole channel precoding matrix. In another aspect, a single CSI process is configured having a plurality of CSI-RS resources. The UE generates channel measurement information for each of the CSI-RS resources, but only sets a CSI report to the base station of a subset of the total number of resources.

15 Claims, 10 Drawing Sheets

(51) Int. Cl.
 *H04B 7/17* (2006.01)
 *H04B 7/26* (2006.01)
(52) U.S. Cl.
 CPC ........... *H04B 7/0486* (2013.01); *H04B 7/065* (2013.01); *H04B 7/0626* (2013.01); *H04B 7/0639* (2013.01); *H04B 7/0691* (2013.01); *H04B 7/17* (2013.01); *H04B 7/2628* (2013.01)
(58) Field of Classification Search
 CPC .... H04B 7/0639; H04B 7/065; H04B 7/0691; H04B 7/17; H04B 7/2628
 See application file for complete search history.

(56) References Cited

U.S. PATENT DOCUMENTS

| | | | |
|---|---|---|---|
| 2012/0063500 A1* | 3/2012 | Wang | H04W 24/10 375/224 |
| 2012/0076028 A1 | 3/2012 | Ko et al. | |
| 2012/0082052 A1 | 4/2012 | Oteri et al. | |
| 2012/0176939 A1 | 7/2012 | Qu et al. | |
| 2012/0201207 A1 | 8/2012 | Liu et al. | |
| 2013/0003788 A1 | 1/2013 | Marinier et al. | |
| 2013/0301560 A1 | 11/2013 | Geirhofer et al. | |
| 2013/0308715 A1 | 11/2013 | Nam et al. | |
| 2013/0322376 A1 | 12/2013 | Marinier et al. | |
| 2013/0329664 A1* | 12/2013 | Kim | H04W 24/10 370/329 |
| 2013/0336214 A1 | 12/2013 | Sayana et al. | |
| 2014/0079149 A1 | 3/2014 | Lee et al. | |
| 2014/0177744 A1* | 6/2014 | Krishnamurthy | H04B 7/065 375/267 |
| 2014/0192762 A1 | 7/2014 | Li et al. | |
| 2014/0192917 A1* | 7/2014 | Nam | H04L 1/0026 375/267 |
| 2014/0241274 A1 | 8/2014 | Lee et al. | |
| 2015/0055723 A1 | 2/2015 | Kim et al. | |
| 2015/0200754 A1 | 7/2015 | Sayana et al. | |
| 2015/0207547 A1* | 7/2015 | Ko | H04B 7/0456 370/252 |
| 2015/0341097 A1* | 11/2015 | Yang | H04L 1/0009 370/329 |
| 2015/0382223 A1 | 12/2015 | Ko et al. | |
| 2016/0156402 A1 | 6/2016 | Hoshino et al. | |
| 2016/0157218 A1* | 6/2016 | Nam | H04B 7/0632 370/329 |
| 2016/0164588 A1* | 6/2016 | Chen | H04B 7/0626 375/267 |
| 2016/0173180 A1* | 6/2016 | Cheng | H04B 7/0417 375/267 |
| 2016/0211895 A1* | 7/2016 | Onggosanusi | H04B 7/0613 |
| 2016/0212643 A1* | 7/2016 | Park | H04B 7/0417 |
| 2017/0302346 A1 | 10/2017 | Jeong et al. | |
| 2017/0331535 A1 | 11/2017 | Wei et al. | |
| 2018/0351621 A1* | 12/2018 | Wei | H04B 7/0632 |
| 2018/0375560 A1 | 12/2018 | Wei et al. | |

FOREIGN PATENT DOCUMENTS

| | | |
|---|---|---|
| CN | 102281128 A | 12/2011 |
| CN | 102340857 A | 2/2012 |
| CN | 102938688 A | 2/2013 |
| CN | 103314614 A | 9/2013 |
| CN | 103580819 A | 2/2014 |
| EP | 2665203 A1 | 11/2013 |
| JP | 2013517661 A | 5/2013 |
| JP | 2013535128 A | 9/2013 |
| KR | 20130138698 A | 12/2013 |
| KR | 20140041422 A | 4/2014 |
| KR | 20140049598 A | 4/2014 |
| WO | WO-2013144360 A1 | 10/2013 |
| WO | WO-2014046507 A1 | 3/2014 |
| WO | WO-2014062195 A1 | 4/2014 |
| WO | WO-2014072796 A1 | 5/2014 |
| WO | WO-2014109557 A1 | 7/2014 |
| WO | WO-2014109622 A1 | 7/2014 |
| WO | WO-2014117748 A1 | 8/2014 |
| WO | WO-2014129858 A1 | 8/2014 |
| WO | WO-2014142504 A1 | 9/2014 |
| WO | WO-2014142516 A1 | 9/2014 |

OTHER PUBLICATIONS

ETRI: "Potential CSI-RS and CSI Feedback Enhancements for EBF/FD-MIMO", 3GPP TSG RAN WG1 Meeting #79, R1-144923, San Francisco, USA, Nov. 17-21, 2014, pp. 1-6.
International Preliminary Report on Patentability—PCT/CN2016/070387, The International Bureau of WIPO—Geneva, Switzerland, dated Jul. 19, 2018.
International Preliminary Report on Patentability—PCT/CN2015/070988, The International Bureau of WIPO—Geneva, Switzerland, dated Aug. 3, 2017.
International Search Report and Written Opinion—PCT/CN2015/070988—ISA/EPO—dated Oct. 26, 2015.
International Search Report and Written Opinion—PCT/CN2016/070387—ISA/EPO—dated Sep. 29, 2016.
Qualcomm Incorporated: "Elevation Beamforming and FD-MIMO with 2D Antenna Array", 3GPP Draft, 3GPP TSG RAN WG1 #79, R1-145087, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014, XP050876121, Retrieved from the Internet: URL:http://www.3gpp.org/ftp/Meetings_3GPP_SYNC/RAN1/Docs/, 4 pages.
Supplementary European Search Report—EP15878333—Search Authority—Munich—dated Nov. 16, 2018.
Supplementary Partial European Search Report—EP16882922—Search Authority—Munich—dated Jul. 2, 2019.
Supplementary European Search Report—EP16882922—Search Authority—Munich—dated Oct. 7, 2019.
Supplementary Partial European Search Report—EP15878333—Search Authority—Munich—dated Jul. 17, 2018.
European Search Report—EP22189915—Search Authority—Munich—dated Nov. 28, 2022.

* cited by examiner

ENHANCED CSI FEEDBACK FOR FD-MIMO

CROSS-REFERENCE TO RELATED APPLICATIONS

This application is a divisional of U.S. application Ser. No. 15/531,131, entitled "ENHANCED CSI FEEDBACK FOR FD-MIMO," filed May 26, 2017, which is a national stage entry of PCT Application No. PCT/CN2015/070988, entitled "ENHANCED CSI FEEDBACK FOR FD-MIMO," filed Jan. 19, 2015. This application is also related to co-pending, commonly assigned U.S. application Ser. No. 15/780,451, entitled "ENHANCED CSI FEEDBACK FOR FD-MIMO," filed May 31, 2018, which is a national stage entry of PCT Application No. PCT/CN2016/070387, entitled "ENHANCED CSI FEEDBACK FOR FD-MIMO," filed Jan. 7, 2016. The disclosures of the above applications are hereby incorporated herein by reference.

BACKGROUND

Field

Aspects of the present disclosure relate generally to wireless communication systems, and more particularly, to enhanced channel state information (CSI) feedback for full-dimensional multiple-input, multiple-output (MIMO) systems.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance communication technologies not only to meet the growing demand for mobile broadband access, but to advance and enhance the user experience with mobile communications.

SUMMARY

According to one aspect of the present disclosure, a method of wireless communication includes receiving, at a UE, a feedback configuration signal that configures a single channel state information (CSI) process identifying azimuth and elevation CSI reference signal (CSI-RS) ports, transmitting, by the UE, a precoding matrix indicator (PMI) report, wherein the PMI report includes at least a first PMI associated with the azimuth CSI-RS ports and a second PMI associated with the elevation CSI-RS ports, wherein at least one of the first PMI and the second PMI is assigned a low rank, and transmitting, by the UE, a CSI report with measurements based on the azimuth and elevation CSI-RS ports.

In another aspect of the disclosure, a method of wireless communication includes receiving, at a UE, a feedback configuration signal that configures a plurality of CSI-RS resources in a single CSI process wherein each of the plurality of CSI-RS resources is associated with a pre-configured CSI-RS antenna virtualization or precoding approach, generating, by the UE, channel measurement information for each of the plurality of CSI-RS resources, and transmitting, by the UE, a CSI report including the channel measurement information for a subset of CSI-RS resources fewer than all of the plurality of CSI-RS resources.

In another aspect of the disclosure, an apparatus configured for wireless communication includes means for receiving, at a UE, a feedback configuration signal that configures a single CSI process identifying azimuth and elevation CSI-RS ports, means for transmitting, by the UE, a PMI report, wherein the PMI report includes at least a first PMI associated with the azimuth CSI-RS ports and a second PMI associated with the elevation CSI-RS ports, wherein at least one of the first PMI and the second PMI is assigned a low rank, and means for transmitting, by the UE, a CSI report with measurements based on the azimuth and elevation CSI-RS ports.

In another aspect of the disclosure, an apparatus wireless communication includes means for receiving, at a UE, a feedback configuration signal that configures a plurality of CSI-RS resources in a single CSI process wherein each of the plurality of CSI-RS resources is associated with a pre-configured CSI-RS antenna virtualization or precoding approach, means for generating, by the UE, channel measurement information for each of the plurality of CSI-RS resources, and means for transmitting, by the UE, a CSI report including the channel measurement information for a subset of CSI-RS resources fewer than all of the plurality of CSI-RS resources.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
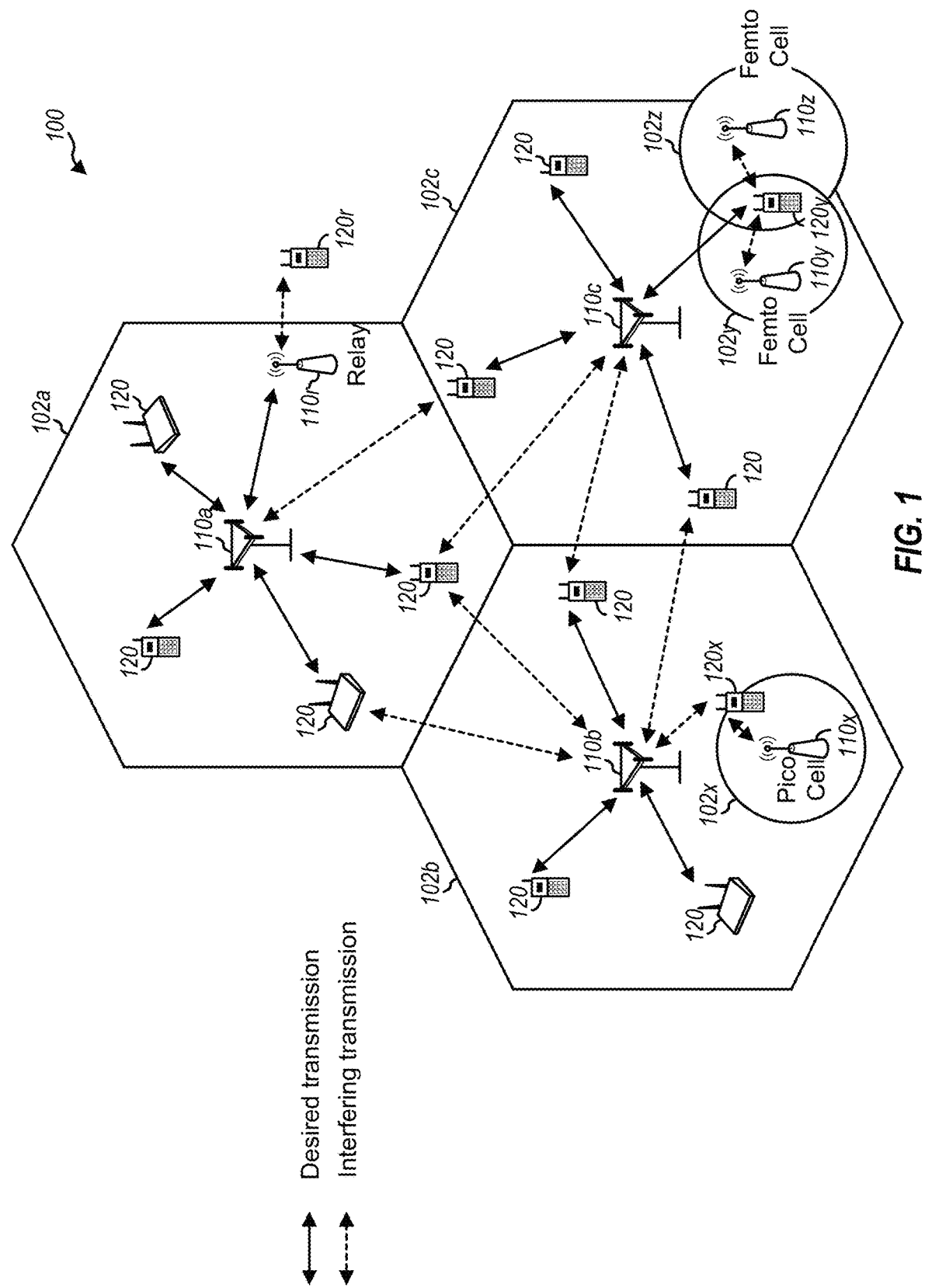
FIG. 1 is a block diagram illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, the eNBs 110a, 110b, 110c may be macro eNBs for the macro cells 102a, 102b, 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a smart phone, a tablet, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
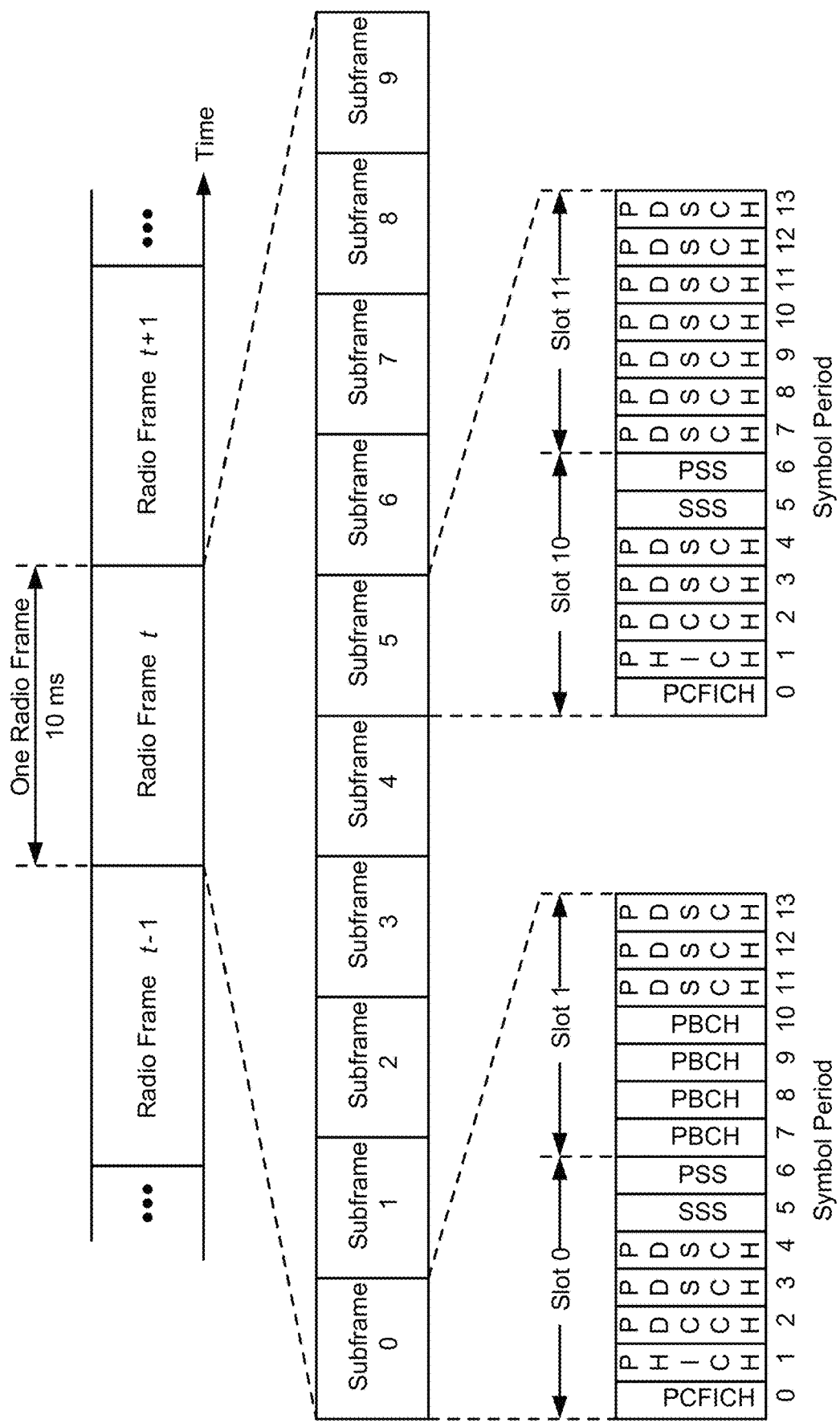
FIG. 2 is a block diagram illustrating an example of a down link frame structure in a telecommunications system.
Figure 6:
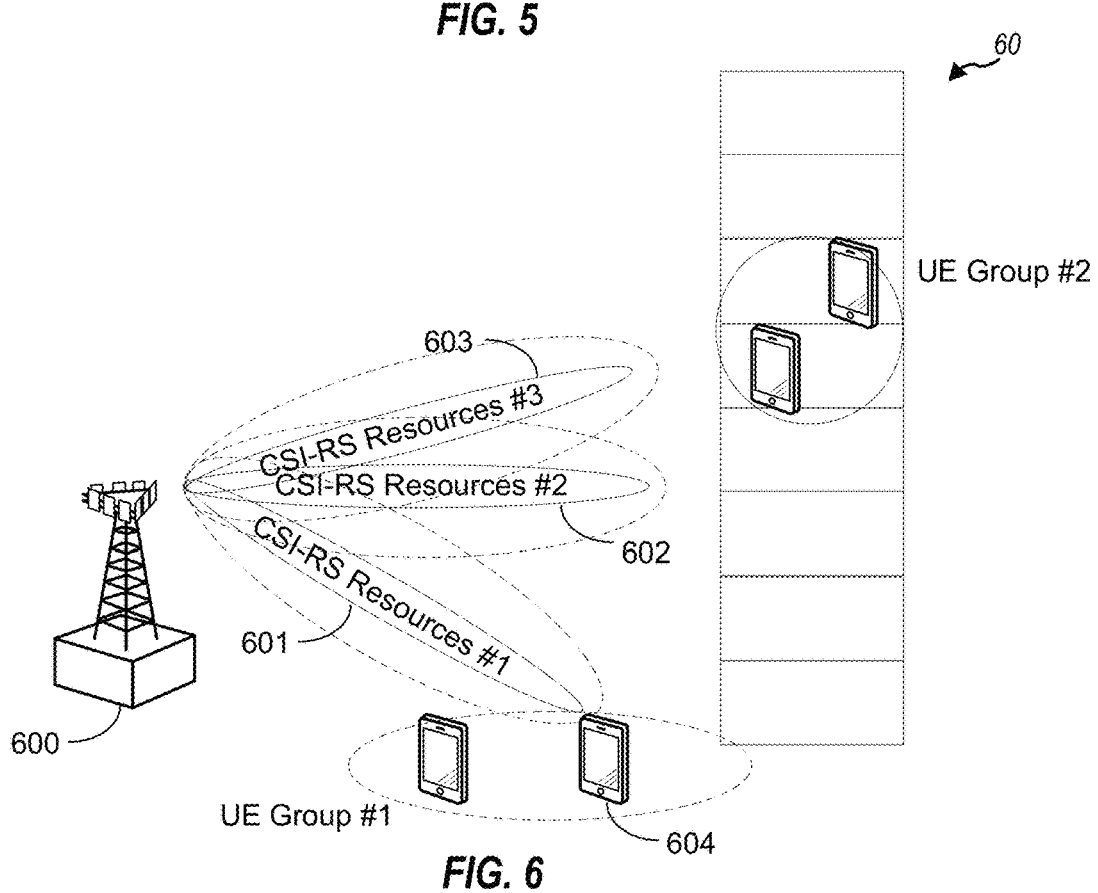
FIG. 6 is a block diagram illustrating a base station transmitting precoded CSI-RS.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
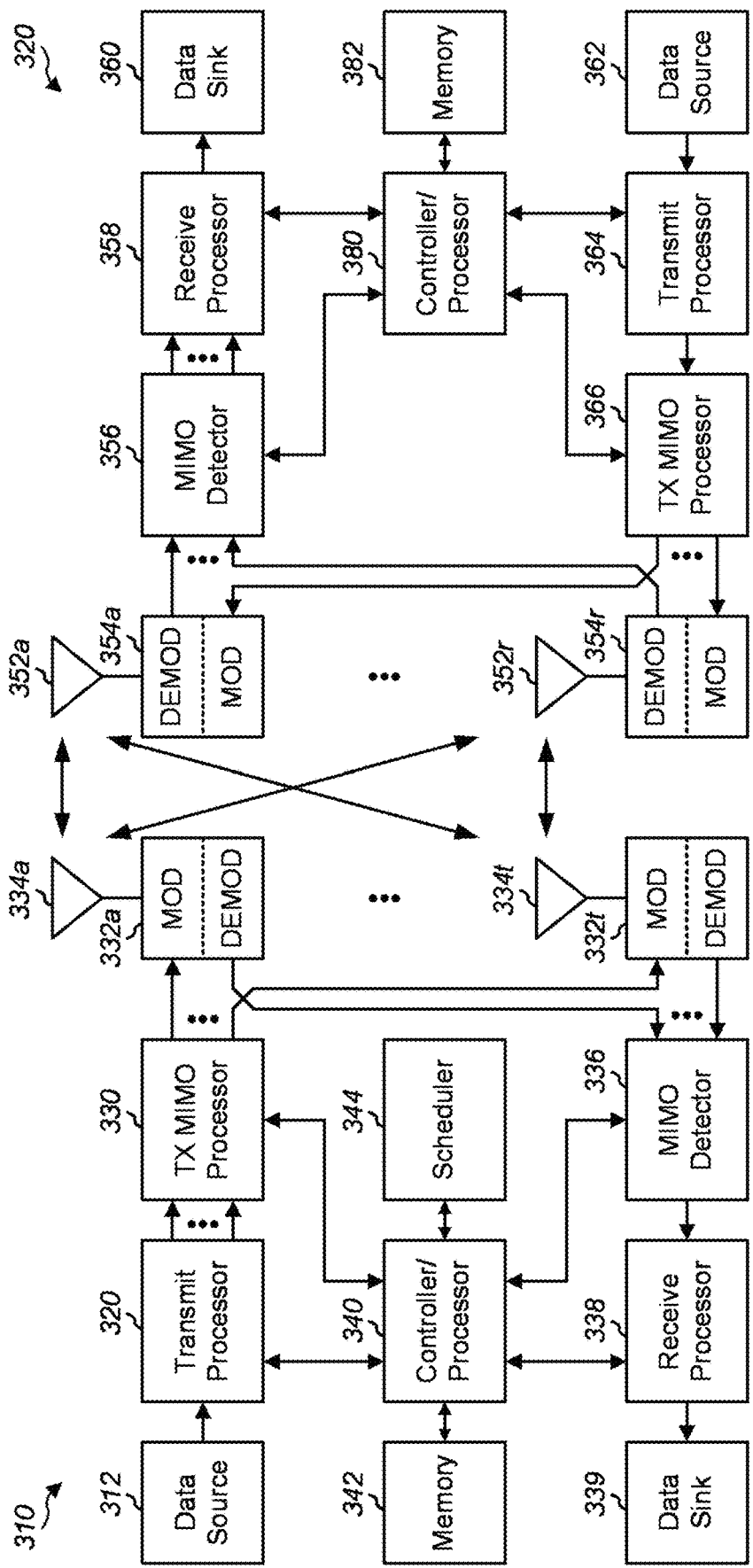
FIG. 3 is a block diagram illustrating a design of a base station and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 7A, 7B, 10A, and 10B, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO, each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Thus, FD-MIMO technologies may take advantage of both azimuth and elevation beamforming, which would greatly improve MIMO system capacity.

Figure 4:
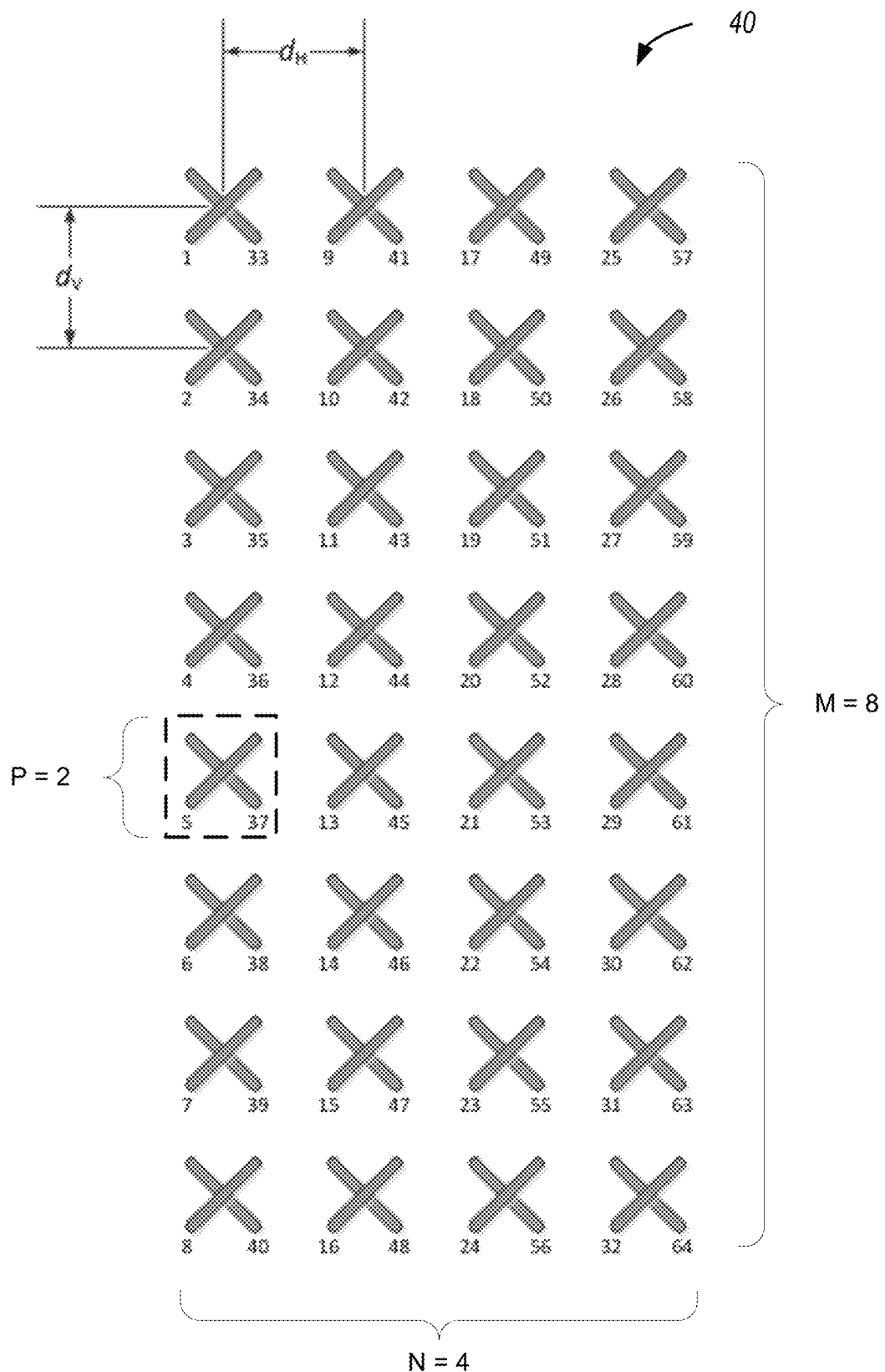
FIG. 4 is block diagram of an exemplary two-dimensional active antenna array.

FIG. 4 is a block diagram illustrating a typical 2D active antenna array 40. Active antenna array 40 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 40 has four columns (N=4), with eight vertical (M=8) cross-polarized antenna elements (P=2).

For a 2D array structure, in order to exploit the vertical dimension by elevation beamforming the channel state information (CSI) is needed at the base station. The CSI, in terms of precoding matrix indicator (PMI) rank indicator (RI) and channel quality indicator (CQI), can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 5:
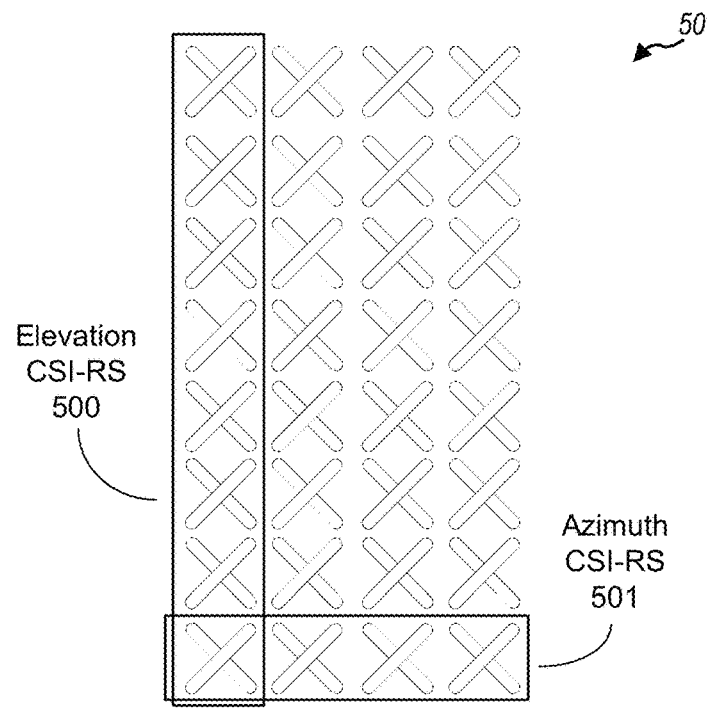
FIG. 5 is a block diagram illustrating elevation and azimuth CSI-RS for dimensional CSI feedback in a two-dimensional active antenna array.

Solutions for FD-MIMO CSI feedback mechanisms have been proposed for FD-MIMO with a large scale two-dimensional antenna array. For example, dimensional CSI feedback provides for a UE to be configured with two CSI processes each with a 1D CSI-RS port structure either on elevation or azimuth direction. FIG. 5 is a block diagram illustrating a two CSI process configuration, each with one dimensional CSI-RS port for the dimensional CSI feedback.. CSI processes will be defined for both elevation CSI-RS ports 500 and azimuth CSI-RS ports 501. The CSI feedback for each configured CSI process will reflect only a one dimensional channel state information. For example, one CSI feedback will only reflect the CSI of elevation CSI-RS ports 500. The serving eNB (not shown) may then determine a correlation between the two separate CSI processes to obtain an estimated full antenna array precoding. For example, the eNB may use the Kronecker product to combine two precoding vectors for the full antenna array precoding.

Another example CSI feedback mechanism employs a precoded CSI-RS with beam selection. FIG. 6 is a block diagram illustrating a base station 600 configured to transmit precoded CSI-RS for CSI feedback. The UEs in UE groups #1 and #2 are positioned at various elevations in relation to base station 600. In a precoded CSI-RS with beam selection, CSI-RS virtualization may be used to compress a large number of antenna ports into a fewer number of precoded CSI-RS ports. The CSI-RS ports with the same virtualization or elevation beamforming may be associated with one CSI process. For example, the CSI-RS Resource #1 may include CSI-RS ports with the same virtualization or elevation beamforming and would be associated with a first CSI process, while CSI-RS Resource #2 and #3 would also be associated with a different CSI process. A UE can be configured with one or multiple CSI processes for CSI feedback, each with different CSI-RS virtualization. In one example, UE 604 of UE group #1 would be configured for three CSI processes to provide measurement information on CSI-RS Resources #1, #2, and #3, respectively. The serving eNB, base station 600, would determine the best serving CSI-RS beam for UE 604 based on reported CSI feedback.

Several problems and challenges exist with the different current solutions for FD-MIMO CSI feedback. For example, with dimensional CSI feedback systems, the mechanism of using two CSI processes is not efficient and may require additional signaling and overhead. If aggregated CQI reporting is supported in such dimensional CSI feedback systems, additional signaling may be required in order to link the multiple CSI processes. Additionally, a modification to the CQI reporting process may also be needed in order to support joint selection of the PMI/RI and aggregated CQI across multiple CSI processes. Such dimensional CSI feedback systems result in large uplink feedback overhead because the UE reports both CSIs of the two configured CSI processes for each periodic CSI reporting.

In the existing precoded CSI-RS with beam selection mechanism, standard CSI feedback mechanisms for multiple CSI processes are used, which may cause a UE to feedback CSI for each configured CSI process. In other words, a UE would not be allowed to select to feedback CSI for only the best CSI process. The UE, under existing mechanisms would feed back the CSI for all of the configured processes. This greatly increases both the UE processing complexity and the uplink feedback overhead. Currently, the CSI-RS resource configuration transmitted via RRC signaling. For precoded CSI-RS, each CSI process may have a limited coverage. When a UE moves within the cell there may be frequent beam switches over multiple CSI processes. In this case, RRC signaling for the CSI-RS resource configuration may both introduce more signaling overhead and provide an inefficient signaling mechanism.

In systems that use distributed EPDCCH, the CSI feedback may be based on un-precoded CSI-RS. Thus, in such cases, one additional CSI process with unprecoded CSI-RS may be configured when a precoded CSI-RS is used for FD-MIMO CSI feedback. This addition of a CSI process with unprecoded CSI-RS may also increase UE processing complexity for CSI measurement and feedback.

Various aspects of the present disclosure provide for improvements to the existing FD-MIMO CSI feedback mechanisms. For example, various aspects improve the dimensional CSI feedback mechanism by using a single CSI process. It is more efficient to use a single CSI process for dimensional CSI feedback. The configuration of one CSI process may include both azimuth and elevation CSI-RS ports for horizontal (H)- and vertical (V)-domain channel measurement. With the single CSI process, the UE would report two PMIs, one for the azimuth CSI-RS ports and the other for the elevation CSI-RS ports. The two PMIs may be jointly selected in order to maximize spectrum efficiency.

Figures 7A, 7B:
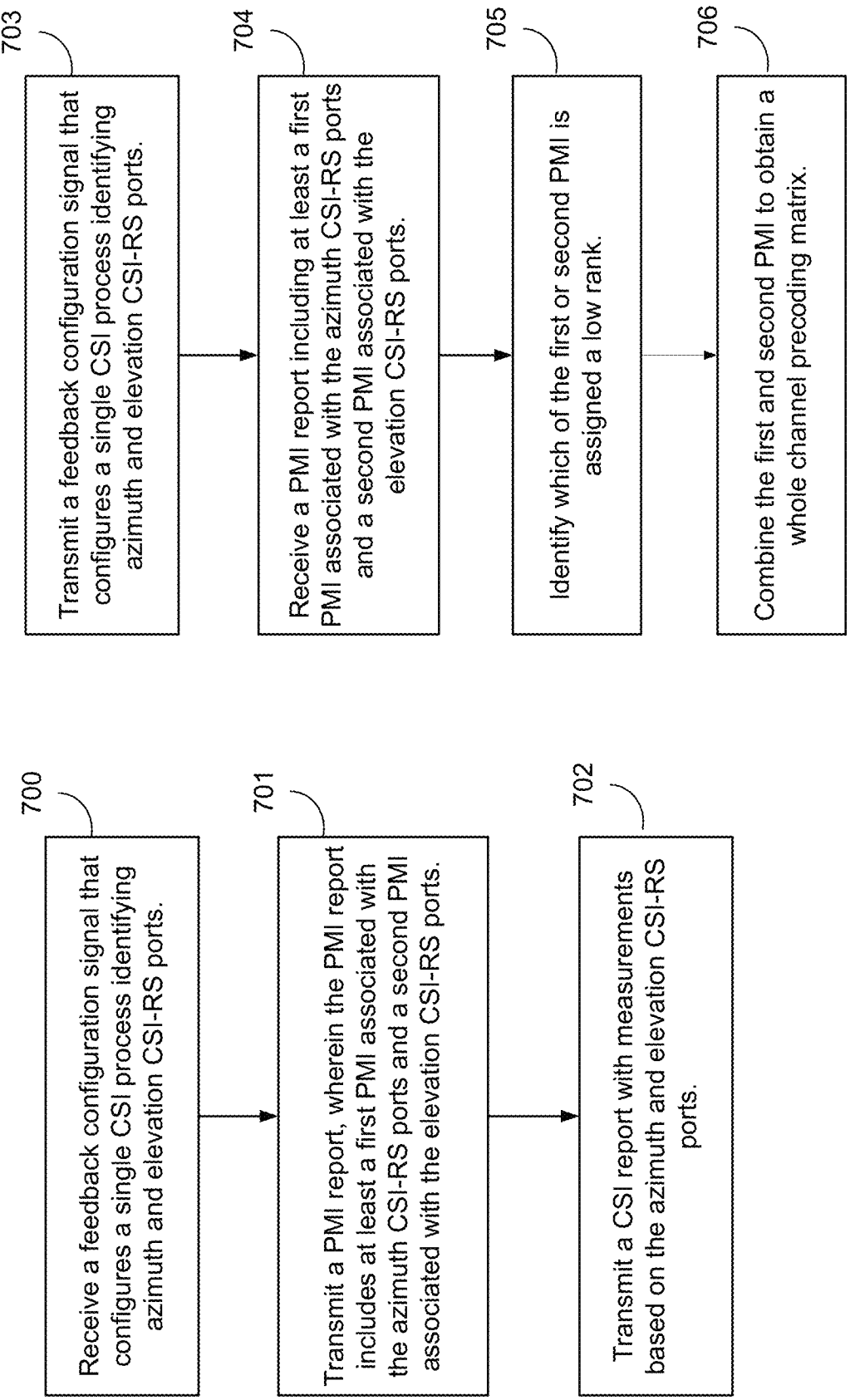
FIGS. 7A and 7B are block diagrams illustrating example blocks executed to implement one aspect of the present disclosure.
Figure 8:
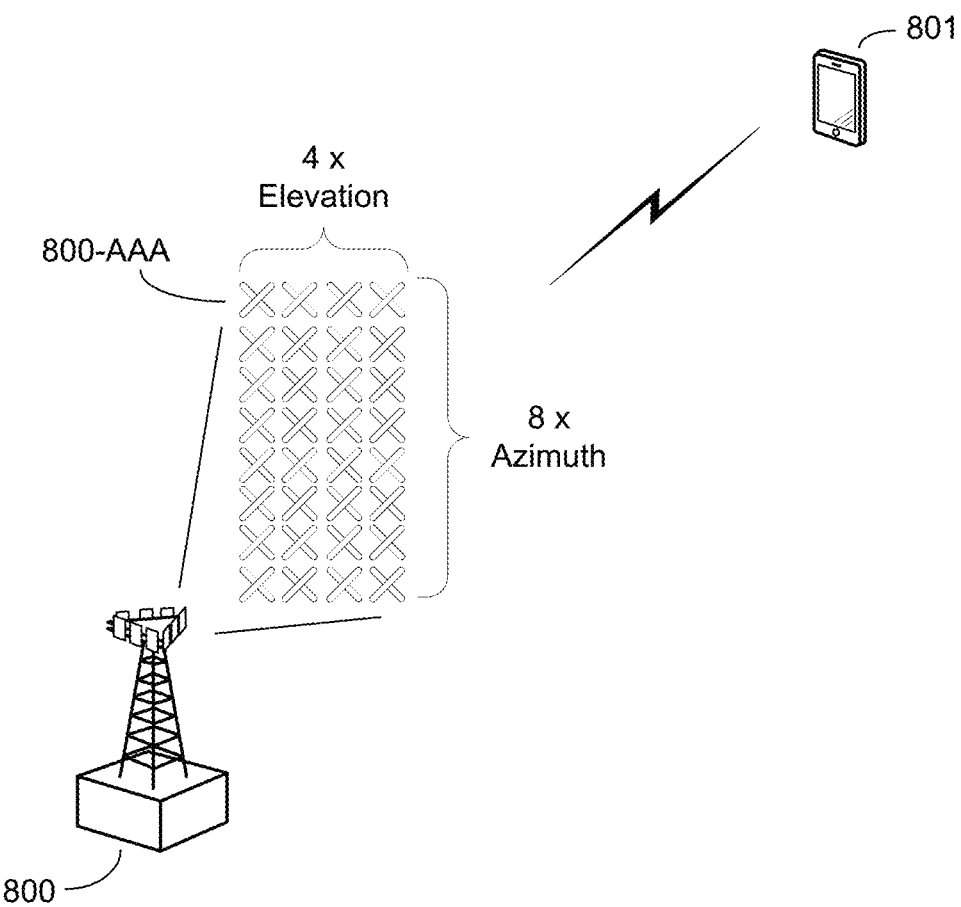
FIG. 8 is a block diagram illustrating a base station and UE configured for enhanced dimensional CSI feedback according to one aspect of the present disclosure.

FIGS. 7A and 7B are block diagrams illustrating example blocks executed to implement aspects of the present disclosure. FIG. 7A illustrates blocks executed by a UE, while FIG. 7B illustrates blocks executed by a base station serving the UE. FIGS. 7A and 7B will also be described in relation to the components illustrated in FIG. 8. FIG. 8 is a block diagram illustrating a base station 800 and UE 801 configured for enhanced dimensional CSI feedback according to one aspect of the present disclosure. Base station 800 includes a 2D-MIMO active antenna array 800-AAA having four sets of elevation ports and eight sets of azimuth ports. At block 703, the serving base station, such as base station 800, transmits a feedback configuration signal that configures a single CSI process identifying both azimuth and elevation CSI-RS ports of 2D-MIMO active antenna array 800-AAA. The UE, such as UE 801, at block 700, receives the feedback configuration signal configuring the single CSI process with both type of CSI-RS ports.

At block 701, UE 801 transmits a PMI report that includes at least a first PMI associated with the azimuth CSI-RS ports and a second PMI associated with the elevation CSI-RS ports. As previously noted, UE 801 may jointly select the PMIs in order to maximize spectrum efficiency. In order to determine a whole channel precoding matrix for the full antenna array, at least one of the two PMIs will be set to a low rank (e.g., rank 1) so that an eNB, such as base station 800, may use a correlation procedure (e.g., a Kronecker product, or the like) to combine the two PMIs in order to determine the whole channel precoding matrix. The CQI/RI may also be determined based on the assumption of Kronecker precoding.

The two PMIs may be either wideband or subband depending on the UE's reporting mode and sorted according to a predefined order (e.g., horizontal (H)-PMI first followed by vertical (V)-PMI for each subband or wideband). In various aspects of the present disclosure, the subband/wideband PMI report for the enhanced dimensional CSI feedback may use one additional bit for each subband or wideband report to indicate which PMI is the assigned low rank (e.g., bit value '0' when the H-PMI is the low rank and value '1' when the V-PMI is the low rank).

In one example aspect, considering 2D cross-polarized (x-pol) active antenna array, 2D-MIMO active antenna array 800-AAA (M,N,P) with P=2, three different configurations may be defined for the single CSI process: Configuration 1 defines M ports with same polarization for elevation (E)-CSI-RS and 2*N x-pol ports for azimuth (A)-CSI-RS; Configuration 2 defines 2*M x-pol ports for E-CSI-RS and N ports with same polarization for A-CSI-RS; and Configuration 3 defines 2*M x-pol ports for E-CSI-RS and 2*N x-pol ports for A-CSI-RS. If single polarized CSI-RS ports are configured in either of the two dimensions the low-rank may be assumed for that dimension as well. Otherwise, UE 801 may selectively determine which PMI is assumed to be low rank. The base station 800 may include an identification of which CSI-RS configuration is used in the feedback configuration message transmitted in block 703. In response to these three different CSI process configurations, UE 801 could have the following two feedback options: Option 1, UE 800 determines the two PMI according to M×1 rank 1 V-PMI and 2*N×L rank L H-PMI (where L represents the additional rank of the other PMI, which may be ≥rank 1); and Option 2, UE 801 determines the two PMI according to N×1 rank 1 H-PMI and 2*M×L rank L V-PMI. Based on a spectrum efficiency maximization criteria, UE 801 will determine which option may be used for selecting the two PMIs for reporting and may, in certain aspects, indicate the selection to base station 800 using a 1-bit indicator transmitted with the PMI report in block 701. It should be noted that if subband PMI reporting is configured, then the 1-bit indicator may be defined per subband.

At block 704, base station 800 receives the PMI report including at least the first PMI associated with the azimuth CSI-RS ports and the second PMI associated with the elevation CSI-RS ports. At block 705, the base station 800 identifies which of the first or second PMIs is assigned the low rank. As noted, the PMI report received from UE 801 may include an additional 1-bit indicator, which identifies the PMI assigned to the low rank. Additional aspects of the present disclosure may provide a fixed location of the PMI assigned to the low rank within the PMI report. Various mechanisms may be used to identify the PMI assigned to the low rank. At block 706, base station 800 combines the two PMI in order to obtain the whole channel precoding matrix. For example, the serving base station may use a Kronecker product in order to combine the H-PMI and V-PMI received from UE 801 into the whole channel matrix.

At block 702, after conducting the measurements on the identified CSI-RS ports of the CSI process, UE 801 transmits a CSI report with the measurement information based on both the azimuth and elevation ports. Base station 800 may then use the whole channel precoding matrix in processing the CSI report from UE 801.

In various operational examples of the different aspects of the present disclosure, the low rank PMI may be restricted to the vertical or horizontal domain. In one such example, with the low rank of rank 1, if the rank 1 is restricted on vertical domain, the channel measurement for the vertical CSI-RS ports is indicated by $h_{V+}^T$ and the channel measurement for the horizontal CSI-RS ports is indicated by $H_H$. A UE may use the Kronecker product to approximate the full channel, e.g. $H \approx h_{V+}^T \otimes H_H$. In addition, the UE may also use the Kronecker product for the full channel precoding matrix, e.g. $W=w_V \otimes W_H$. Then, the selection of V-PMI $w_V$ and H-PMI $w_V$ can be formulated by $$\hat{W}_\Box = \underset{W \in \Omega}{\operatorname{argmax}} SNR(U_\Box^H HW)$$

Where $HW=H(w_V \otimes W_H) \approx \operatorname{diag}(H_v w_v) \cdot (H_H W_H)$ and $U_H$ is RX weight vector by UE.

Figure 9:
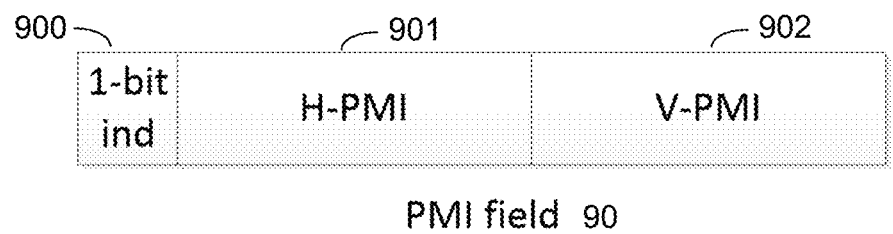
FIG. 9 is a block diagram illustrating a PMI report configured according to one aspect of the present disclosure.

If rank 1 is restricted on horizontal domain, then $H \approx H_V \otimes h_{H+}^T$, $W=W_V \otimes w_H$ and $H(W_V \otimes w_H) \approx (H_V W_V \cdot \operatorname{diag}(H_H w_H)$ FIG. 9 is a block diagram illustrating an exemplary PMI report configured according to one aspect of the present disclosure. The PMI report includes a PMI field 90. The PMI report which may be subband or wideband PMI according to the illustrated example includes three parts: (1) a 1-bit low rank indicator 900 for V-PMI or H-PMI, which identifies to the eNB which of the vertical or horizontal PMI values is the low rank PMI; (2) an H-domain precoding vector indicator (H-PMI) 901; and (3) a V-domain precoding vector indicator (V-PMI) 902. The order of three PMI report parts may be fixed as shown in FIG. 9 or may be some other combination of the three PMI report parts.

Various aspects also include enhanced CSI resource configuration for precoded CSI-RS. Such aspects may provide multiple CSI-RS resource configurations in a single CSI process. For example, one CSI-RS resource configuration may correspond to a specific CSI-RS virtualization or CSI-RS beamforming. The multiple CSI-RS resource configurations in one CSI process could have different frequency or time resource mapping, periodicity, number of CSI-RS ports, and the like. A UE would perform channel measurements for each CSI-RS resource configuration separately and generate the CSI for each CSI-RS resource configuration. However, the UE would not be required to report all the generated CSIs to the network.

Figures 10A, 10B:
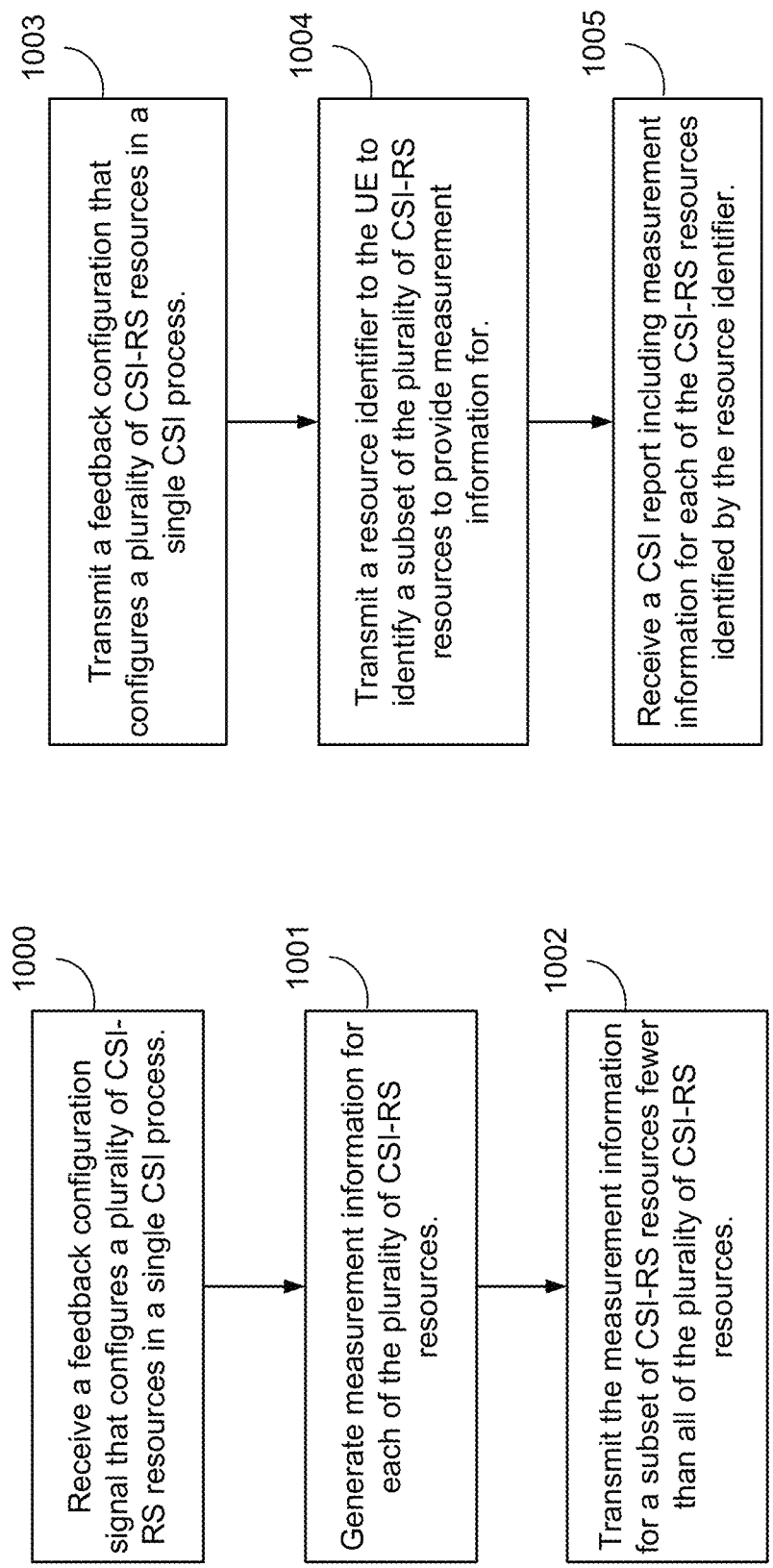
FIGS. 10A and 10B are block diagrams illustrating example blocks executed to implement one aspect of the present disclosure.

FIGS. 10A and 10B are block diagrams illustrating example blocks executed to implement aspects of the present disclosure. FIG. 10A illustrates blocks executed by a UE, while FIG. 10B illustrates blocks executed by a base station serving the UE. FIGS. 10A and 10B will also be described in relation to the components illustrated in FIG. 6. At block 1003, base station 600 transmits a feedback configuration signal that configures a plurality of CSI-RS resources in a single CSI process. For example, base station 600 may configure each of CSI-RS resources #1, #2, and #3 for a single CSI process. This configuration is transmitted in the feedback configuration signal. Each of the CSI-RS resources may also be associated with either a pre-configured CSI-RS antenna virtualization or a precoding approach for the UE to precode CSI feedback for such CSI-RS resources. At block 1000, a UE, such as UE 604, receives the feedback configuration signal configuring the plurality of CSI-RS signals for the single CSI process.

At block 1001, UE 604 generates measurement information for each of the plurality of CSI-RS resources. For example, UE 604 measures the channel conditions of CSI- RS resources #1, #2, and #3. At block 1002, UE 604 transmits the measurement information for a subset of the CSI-RS resources fewer than the total number of CSI-RS resources identified. Various mechanisms may be used to determine which CSI to report. For example, the total number of CSI to report may be configured by the network. In such example aspects, base station 600, at block 1004, transmits a resource identifier to UE 604 to identify the subset of CSI-RS resources to provide measurements for.

Alternatively, the selection of CSI reporting can be determined by the UE. For example, UE 604 may autonomously report CSI, in which UE 604 determines the "best" CSI-RS resource for CSI report. For purposes of such autonomous reporting, the "best" CSI-RS resource may be the resource which results in the maximum spectrum efficiency. In alternative aspects, best may include the highest received signal strength indicator, lowest interference, or the like. In the example illustrated with respect of FIG. 6, UE 604 identifies CSI-RS resources #1 and #2 as the best options which maximize spectrum efficiency, and transmits the measurement information for CSI-RS resources #1 and #2 to base station 600. In addition to reporting CQI, PMI, RI, and the like, the UE may also report the index of the CSI-RS resource associated with the reported CSI in the feedback signal. Thus, UE 604 would report index 1 and 2 corresponding to CSI-RS resources #1 and #2 with the transmitted CSI report. Whether the selection of the subset of CSI-RS resources is UE-controlled or network-controlled, at block 1005, base station 600 receives a CSI report that includes measurement information for each of the CSI-RS resources of the identified subset.

As previously noted, existing precoded CSI-RS feedback mechanisms do not support the unprecoded CSI-RS of EPDCCH. In order to support such distributed EPDCCH, aspects of the present disclosure may define a mixed CSI-RS configuration, which includes both precoded and un-precoded CSI-RS resources (for purposes of illustration, CSI-RS resources #1 and #3 could be precoded, while CSI-RS resource #2 may not be precoded). One additional bit in the CSI-RS resource configuration may be used to indicate whether or not the CSI-RS is precoded. The network may then trigger the UE to report CSI based on precoded or un-precoded CSI-RS ports.

Additional aspects of the present disclosure may, if configured by the network, also multiplex multiple CSI for a subset of the configured CSI-RS resources into one report for aperiodic CSI reporting. The position of the M selected CSI-RS resource configurations may also be included in such multiplexed CSI report.

Another aspect of the present disclosure may provide for the CSI reporting to be related to a subset of configured CSI-RS resources implicitly controlled by the network. In application of such aspects for aperiodic CSI reporting, the network can implicitly trigger identification of the CSI-RS resources to use through another type of signaling. Such aspects implementing implicit triggering may be based on the CSI reporting subframe, n, and a pre-configured time domain threshold, K. For example, CSI-RS resource configurations between subframes (n−K, n−4) with different CSI-RS virtualizations or beamforming may be included for aperiodic CSI reporting.

Additional aspects in which the UE is triggered to report multiple aperiodic CSI feedback in one report instance, each associated with different CSI-RS resource configurations in one CSI process, the multiple A-CSI reports can be placed in an order based on the index of CSI-RS resource configuration in the CSI process. In such cases, there may be no need for the UE to explicitly include the CSI-RS resource index in the CSI report.

Figure 11:
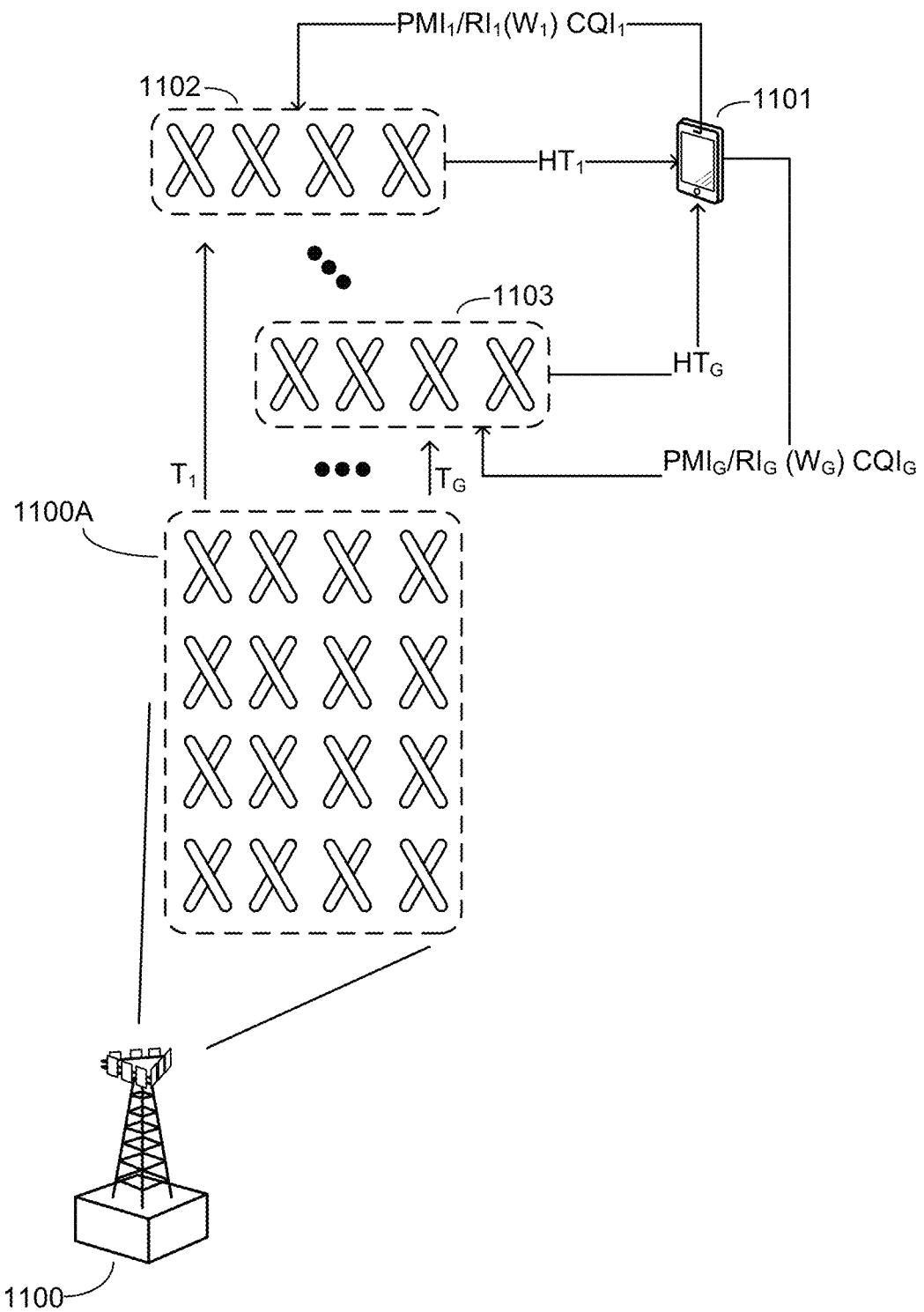
FIG. 11 is a block diagram illustrating a CSI report based on enhanced CSI resource configuration for precoded CSI-RS feedback and beam selection.

FIG. 11 is a block diagram illustrating a CSI configuration with multiple precoded CSI-RS ports according to one aspect of the present disclosure. Base station 1100 includes a 2D-MIMO active antenna array 1100A. The precoding of the CSI-RS ports provides an approach for UE 1101 to provide CSI feedback. For example, preconfigured CSI-RS ports 1102 and 1103 are precoded with wideband matrices, $T_1$ and $T_G$, respectively. Therefore, when generating the CSI feedback, UE 1101 may provide feedback on virtualized CSI-RS ports. Considering the whole antenna matrix, H, the CSI determined by UE 1101 may, instead be based on the virtualized matrix, $HT_1$ and $HT_G$, respectively. UE 1101 may then generate the respective CSI feedback $PMI_1/RI_1$ ($W_1$) $CQI_1$ and $PMI_G/RI_G$ ($W_G$) $CQI_G$.

It should be noted that the selection of CSI-RS resource configuration may be performed either on a per subband basis, if subband CQI/PMI reporting is configured, or on a wideband basis, if wideband CQI/PMI is configured.

Figure 12A:
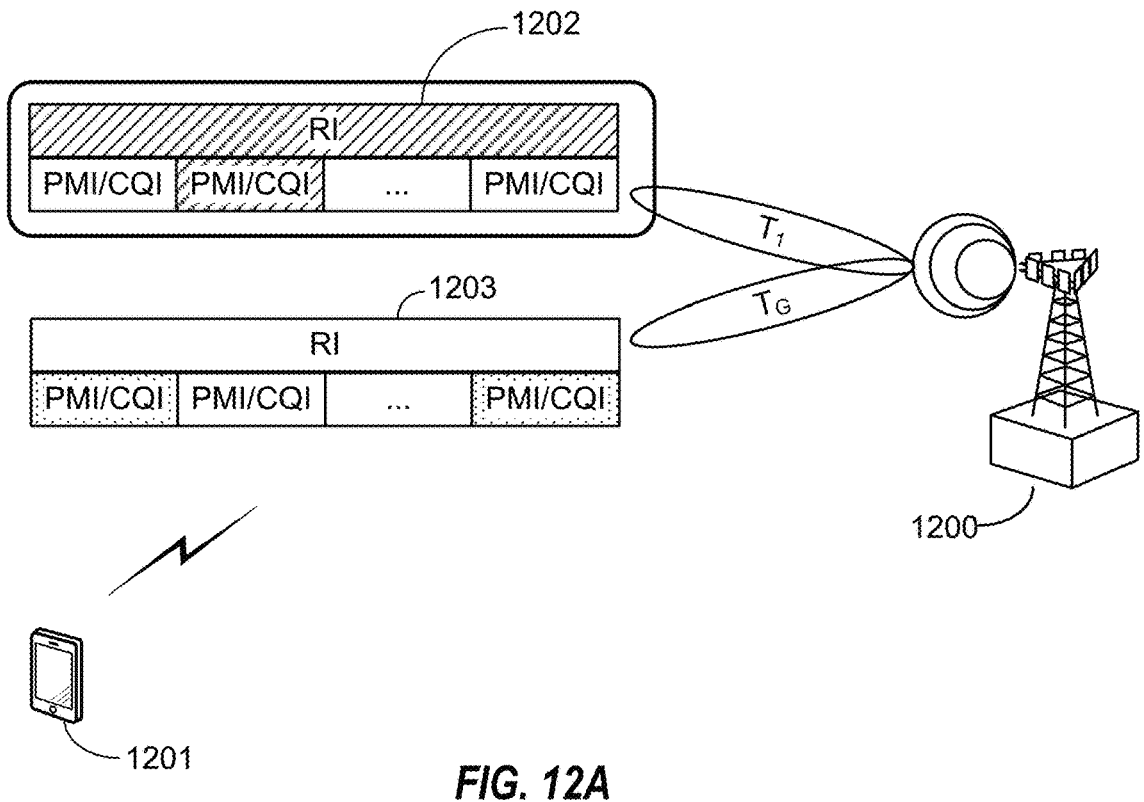
FIG. 12A is a block diagram illustrating a wideband CSI-RS resource selection configured according to one aspect of the present disclosure.

FIG. 12A is a block diagram illustrating a wideband CSI-RS resource selection configured according to one aspect of the present disclosure. FIG. 12A illustrates a CSI-RS resource 1202 selection on a wideband basis by UE 1201 for CSI reporting. UE 1201 measures the channel conditions of each CSI-RS resources separately and generates the CSI reporting. As depicted, each resource may have a different rank indicator. In the example illustrated with respect of FIG. 12A, UE 1201 identifies CSI-RS resource 1202 as the best option, and transmits the CSI measurement report information for CSI-RS resource 1202 to base station 1200. The CSI-RS resource selection is made on a wideband basis, which means the base station will transmit PDSCH to UE 1201 using the PMI associated the same CSI-RS resource even though UE 1201 is assigned with multiple subbands in the frequency domain. The CSI-RS resource selection can also be adapted on the time domain, in which the more favorable CSI-RS resources may change over time.

Figure 12B:
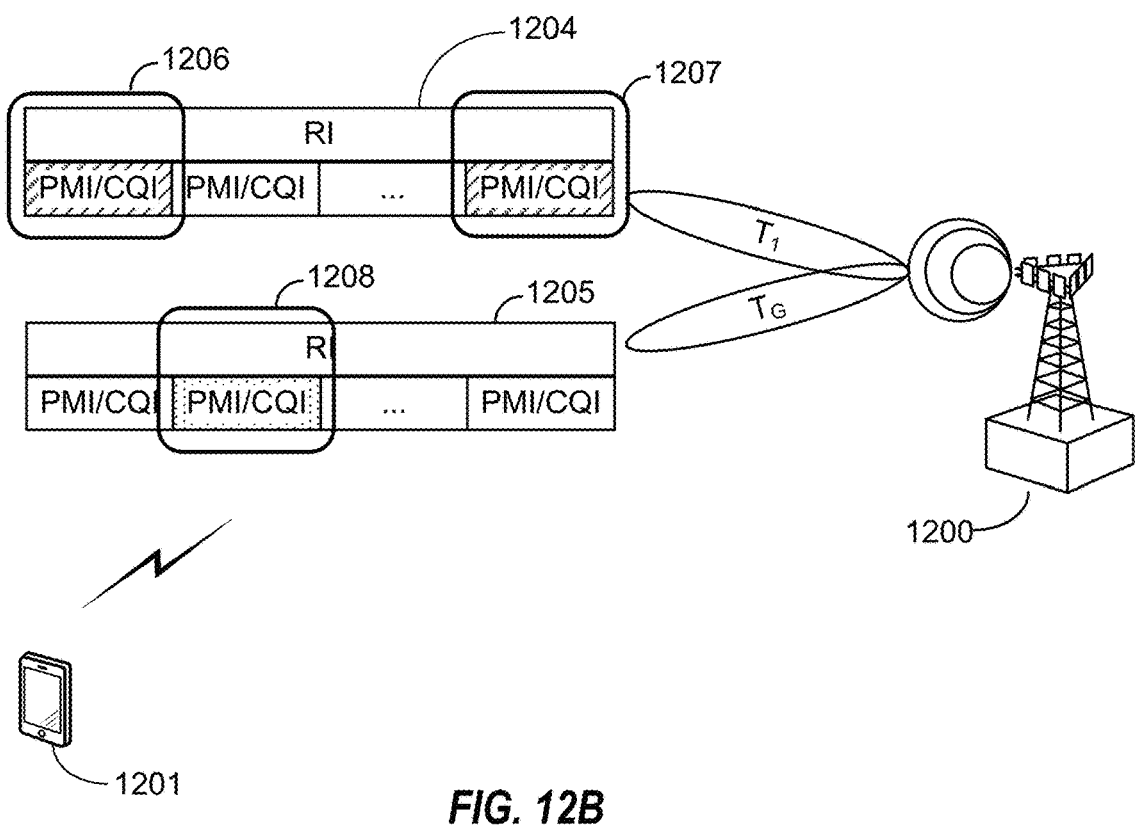
FIG. 12B is a block diagram illustrating a subband CSI-RS resource selection configured according to one aspect of the present disclosure.

FIG. 12B is a block diagram illustrating a subband CSI-RS resource selection configured according to one aspect of the present disclosure. FIG. 12B illustrates a CSI-RS resource selection of subbands 1206-1208 from CSI-RS resources 1204 and 1205 by UE 1201. In the example illustrated with respect of FIG. 12B, UE 1201 jointly determines the CSI for each of the CSI-RS resources 1204 and 1205 by using a common rank indicator . As depicted, each of the CSI-RS resources 1204 and 1205 may have different subband-wise PMI/CQIs under the common rank indicator. A most favorable or best CSI-RS resource may be identified for each subband. The subband selection as depicted allows base station 1200 to transmit PDSCH with the subband-wise PMI associated with different CSI-RS resources.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7A, 7B, 10A, and 10B may comprise processors, electronics devices, hardware devices, electronics components, logical circuits, memories, software codes, firmware codes, etc., or any combination thereof Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), a feedback configuration signal that configures a single channel state information (CSI) process identifying azimuth and elevation CSI reference signal (CSI-RS) ports;
   transmitting, by the UE, a precoding matrix indicator (PMI) report, wherein the PMI report includes a first PMI associated with the azimuth CSI-RS ports, a second PMI associated with the elevation CSI-RS ports, and a low rank indicator, wherein at least one of the first PMI and the second PMI is assigned a low rank, and wherein the low rank indicator denotes which of the first PMI or the second PMI is assigned the low rank; and
   transmitting, by the UE, a CSI report with measurements based on the azimuth and elevation CSI-RS ports.

2. The method of claim 1, wherein the PMI report is arranged according to a fixed order of the low rank indicator, the first PMI, and the second PMI.

3. The method of claim 1, wherein the CSI report includes a rank indicator (RI) and a channel quality indicator (CQI), wherein the CQI and RI are determined based on the first PMI, the second PMI, and the low rank indicator.

4. The method of claim 1, further including:
   determining, by the UE, the low rank indicator for the first PMI and the second PMI based, at least in part, on the feedback configuration signal configuring the single CSI process, wherein the PMI report further includes the low rank indicator.

5. An apparatus configured for wireless communication, the apparatus comprising:
   at least one processor; and
   a memory coupled to the at least one processor,
   wherein the at least one processor is configured to:

receive, at a user equipment (UE), a feedback configuration signal that configures a single channel state information (CSI) process identifying azimuth and elevation CSI reference signal (CSI-RS) ports;

transmit, by the UE, a precoding matrix indicator (PMI) report, wherein the PMI report includes a first PMI associated with the azimuth CSI-RS ports and a second PMI associated with the elevation CSI-RS ports, and a low rank indicator, wherein at least one of the first PMI and the second PMI is assigned a low rank, and wherein the low rank indicator denotes which of the first PMI or the second PMI is assigned the low rank; and transmit, by the UE, a CSI report with measurements based on the azimuth and elevation CSI-RS ports.

6. The apparatus of claim 5, wherein the PMI report is arranged according to a fixed order of the low rank indicator, the first PMI, and the second PMI.

7. The apparatus of claim 5, wherein the CSI report includes a rank indicator (RI) and a channel quality indicator (CQI), wherein the CQI and RI are determined based on the first PMI, the second PMI, and the low rank indicator.

8. The apparatus of claim 5, wherein the at least one processor is further configured to:

determine, by the UE, the low rank indicator for the first PMI and the second PMI based, at least in part, on the feedback configuration signal configuring the single CSI process, wherein the PMI report further includes the low rank indicator.

9. An apparatus for wireless communication, comprising:

means for receiving, at a user equipment (UE), a feedback configuration signal that configures a single channel state information (CSI) process identifying azimuth and elevation CSI reference signal (CSI-RS) ports;

means for transmitting, by the UE, a precoding matrix indicator (PMI) report, wherein the PMI report includes a first PMI associated with the azimuth CSI-RS ports and a second PMI associated with the elevation CSI-RS ports, and a low rank indicator, wherein at least one of the first PMI and the second PMI is assigned a low rank, and wherein the low rank indicator denotes which of the first PMI or the second PMI is assigned the low rank; and means for transmitting, by the UE, a CSI report with measurements based on the azimuth and elevation CSI-RS ports.

10. The apparatus of claim 9, wherein the PMI report is arranged according to a fixed order of the low rank indicator, first PMI, and second PMI.

11. The apparatus of claim 9, wherein the CSI report includes a rank indicator (RI) and a channel quality indicator (CQI), wherein the CQI and RI are determined based on the first PMI, the second PMI, and the low rank indicator.

12. The apparatus of claim 9, further including:

means for determining, by the UE, the low rank indicator for the first PMI and the second PMI based, at least in part, on the feedback configuration signal configuring the single CSI process, wherein the PMI report further includes the low rank indicator.

13. The method of claim 1, wherein the first PMI and the second PMI are combinable to form a whole channel precoding matrix.

14. The method of claim 13, wherein a correlation procedure is used to combine the first PMI and the second PMI to form the whole channel precoding matrix.

15. The method of claim 14, wherein the correlation procedure comprises a Kronecker product.

* * * * *